US012172863B2

(12) United States Patent
Yamaguchi

(10) Patent No.: US 12,172,863 B2
(45) Date of Patent: Dec. 24, 2024

(54) IMAGE FORMING APPARATUS

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 238 days.

(21) Appl. No.: 17/952,065

(22) Filed: Sep. 23, 2022

(65) Prior Publication Data

US 2023/0096244 A1 Mar. 30, 2023

(30) Foreign Application Priority Data

Sep. 27, 2021 (JP) ................................ 2021-156981

(51) Int. Cl.

| | |
|---|---|
| ***B65H 9/00*** | (2006.01) |
| ***B65H 5/06*** | (2006.01) |
| ***B65H 7/02*** | (2006.01) |
| ***B65H 9/10*** | (2006.01) |

(52) U.S. Cl.

CPC ............ *B65H 9/002* (2013.01); *B65H 5/062* (2013.01); *B65H 7/02* (2013.01); *B65H 9/006* (2013.01); *B65H 9/10* (2013.01); *B65H 9/106* (2013.01); *B65H 2511/24* (2013.01); *G03G 2215/1657* (2013.01); *G03G 2221/0052* (2013.01); *G03G 2221/1624* (2013.01)

(58) Field of Classification Search

CPC . B65H 5/062; B65H 7/02; B65H 7/06; B65H 7/08; B65H 7/14; B65H 7/20; B65H 9/002; B65H 9/10; B65H 9/103; B65H 9/106; B65H 9/12; B65H 2301/531; B65H 2404/142; B65H 2404/14212; B65H 2511/24; G03G 2215/1647; G03G 2215/1657; G03G 2221/0005; G03G 2221/0026; G03G 2221/0052; G03G 2221/1624

See application file for complete search history.

(56) References Cited

U.S. PATENT DOCUMENTS 5,835,822 A * 11/1998 Nagasaki ........... G03G 21/1821 399/106
2015/0132039 A1* 5/2015 Tobinaga ............... B65H 1/266 399/388
2020/0255241 A1* 8/2020 Hirahara ................ B65H 9/166

FOREIGN PATENT DOCUMENTS

JP 2017083766 A 5/2017
JP 2020050493 A 4/2020

* cited by examiner

*Primary Examiner* — Prasad V Gokhale
(74) *Attorney, Agent, or Firm* — Alleman Hall & Tuttle LLP

(57) ABSTRACT

An image forming apparatus according to the present disclosure includes a skew correction device and a cleaning device. The skew correction device includes first conveying rollers. The first conveying rollers are rotatable about a predetermined rotation fulcrum. The first conveying rollers are, before a sheet, which is skewed, enters a device body, rotated from an initial position, and, when the sheet enters the device body, rotated back to the initial position while nipping and conveying the sheet. The cleaning device includes a toner conveying member that conveys residual toner on an image-carrying member to a predetermined container. Both the first conveying rollers and the toner conveying member operate by consecutively receiving a rotational driving force from a common electric motor.

4 Claims, 16 Drawing Sheets

IMAGE FORMING APPARATUS

INCORPORATION BY REFERENCE

This application is based upon and claims the benefit of priority from the corresponding Japanese Patent Application No. 2021-156981 filed on Sep. 27, 2021, the entire contents of which are incorporated herein by reference.

BACKGROUND

The present disclosure relates to an image forming apparatus that transfers a toner image onto a conveyed sheet to thus form an image on the sheet.

An image forming apparatus such as a printer, a copying machine, a facsimile, and a multifunction peripheral including these functions is well known. The image forming apparatus includes a cleaning device that removes toner remaining on a surface of an image-carrying member such as a photoconductor drum and an intermediate transfer belt. The cleaning device includes a toner removement member, a toner conveying member, and the like. The toner removement member removes the toner remaining on the surface of the image-carrying member after transfer of a toner image. The toner conveying member conveys the toner removed by the toner removement member to a predetermined used toner container. For example, the toner conveying member is a spiral shaft member including a spiral blade, that is rotated to convey toner in an axial direction. The toner conveying member is rotationally driven upon receiving a rotational driving force from an electric motor such as a motor. Conventionally, as a drive source of the rotational driving force, the image forming apparatus is provided with a dedicated electric motor for driving only the toner conveying member.

In addition, another conventional image forming apparatus includes a sheet conveying device capable of preventing lowering of a conveying efficiency and preventing a skew of a sheet.

SUMMARY

An image forming apparatus according to one aspect of the present disclosure is an image forming apparatus that forms an image on a sheet by transferring a toner image carried by an image-carrying member onto the sheet. The image forming apparatus includes a skew correction device and a cleaning device. The skew correction device corrects a skew of the sheet conveyed in a predetermined conveying direction on a conveying path leading to a transfer position. The cleaning device removes residual toner remaining on the image-carrying member after the transfer, and conveys the residual toner to a predetermined container.

The skew correction device includes first conveying rollers. The first conveying rollers are configured to be rotatable about a predetermined rotation fulcrum. The first conveying rollers are, before the sheet, which is skewed, enters a device body, rotated from an initial position only by a tilt amount corresponding to a tilt of the sheet, and, when the sheet enters the device body, rotated back to the initial position while nipping and conveying the sheet.

The cleaning device includes a toner conveying member that conveys the residual toner removed from the image-carrying member to the predetermined container.

Both the first conveying rollers and the toner conveying member operate by consecutively receiving a rotational driving force from a common electric motor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described while referring to the attached drawings as appropriate. It is noted that the following embodiment is an embodied example of the present disclosure and does not limit the technical scope of the present disclosure.

Figure 1:
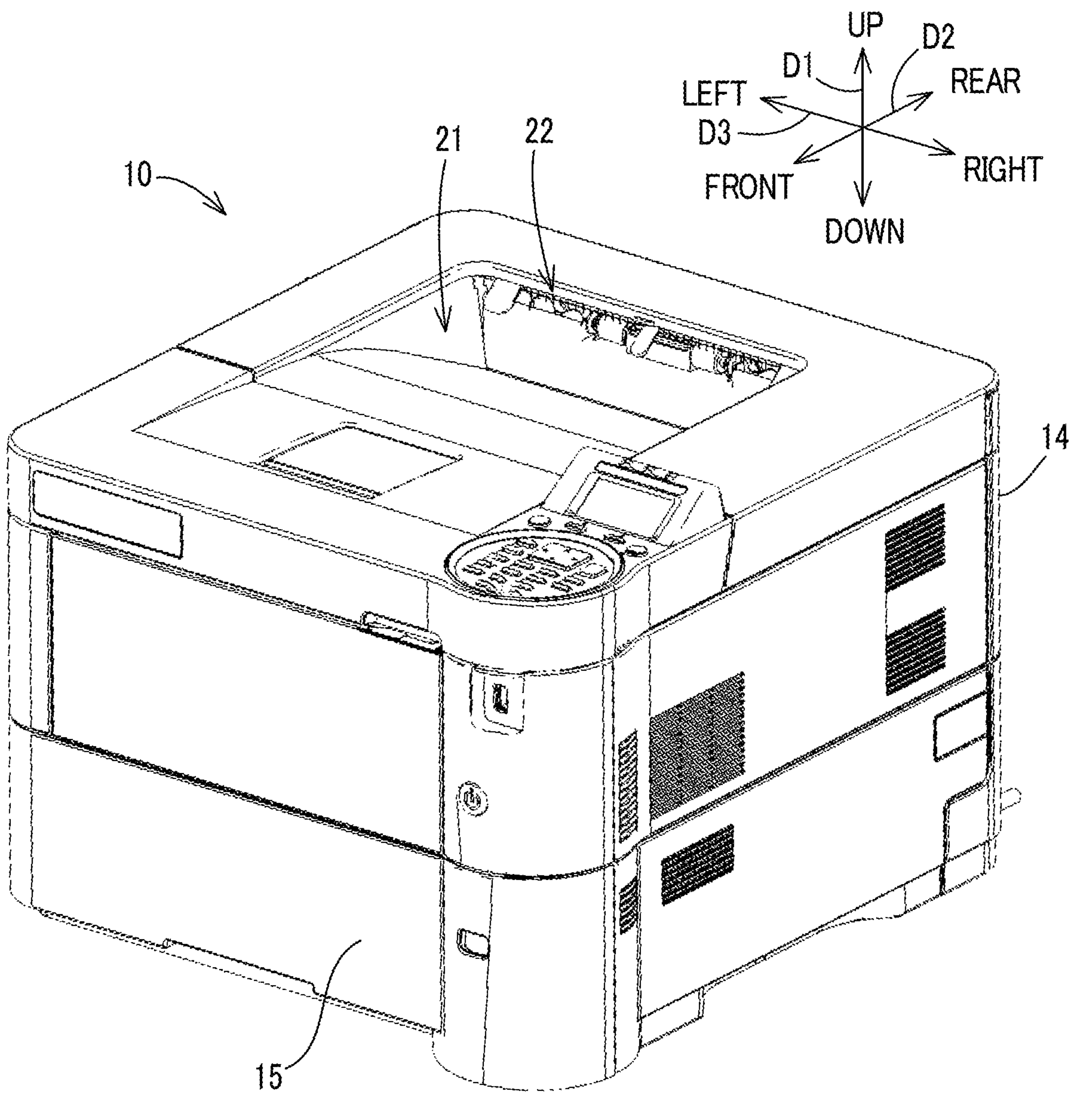
FIG. 1 is a perspective view showing a configuration of an image forming apparatus according to an embodiment of the present disclosure.
Figure 2:
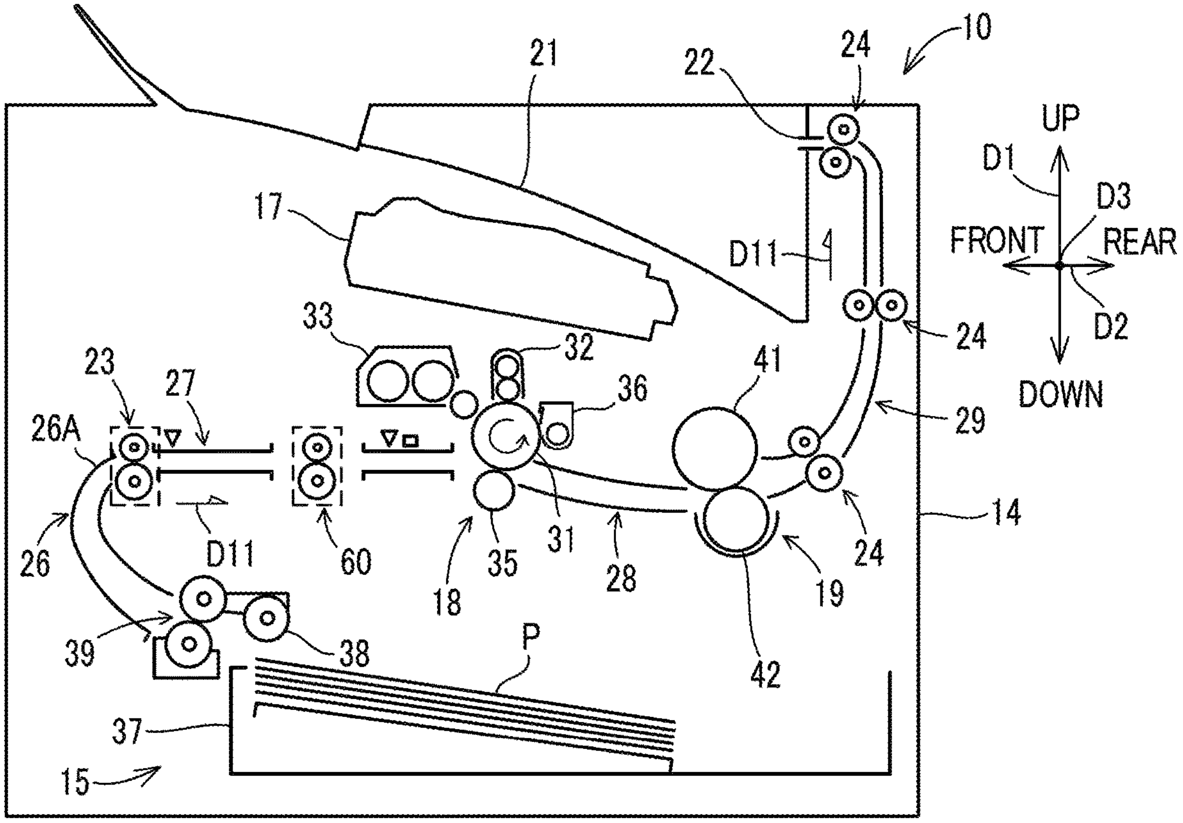
FIG. 2 is a schematic diagram showing an internal configuration of the image forming apparatus.

FIG. 1 is a perspective view of an image forming apparatus 10. FIG. 2 is a diagram showing an internal configuration of the image forming apparatus 10. In descriptions below, an up-down direction D1 is defined based on a state where the image forming apparatus 10 is usably set (a state shown in FIG. 1), a front-rear direction D2 is defined in a state where a front side (front surface side) is assumed to be the front, and a left-right direction D3 is defined in a state where the image forming apparatus 100 is seen from the front side (front surface side).

[Image Forming Apparatus 10]

As shown in FIG. 1, the image forming apparatus 10 is a printer that prints an image on a printing sheet P (an example of a sheet). It is noted that the image forming apparatus 10 is not limited to a printer including only a printing function. For example, the present disclosure is also applicable to a multifunction peripheral including respective functions of a printer, a facsimile, a copying machine, and the like, a copying machine, and the like.

The image forming apparatus 10 prints an image on the printing sheet P using a printing material such as toner. As shown in FIG. 2, the image forming apparatus 10 mainly includes an image forming portion 18 that uses electrophotography, an exposure device 17, a fixing portion 19, a sheet feed device 15, a sheet conveying unit 23, a sheet correction mechanism 60, a sheet discharge portion 21, and a control portion 90 (see FIG. 5) that collectively controls the image forming apparatus 10. These are provided inside a housing 14 that constitutes an outer frame cover or internal frame of the image forming apparatus 10.

As shown in FIG. 2, the sheet feed device 15 is provided at the very bottom of the image forming apparatus 10. The sheet feed device 15 includes a sheet feed tray 37, a pickup roller 38, and a pair of sheet feed rollers 39. The sheet feed tray 37 stores the printing sheet P on which an image is to be formed by the image forming portion 18, and is supported by the housing 14. The pickup roller 38 and the pair of sheet feed rollers 39 are provided above a front portion of the sheet feed tray 37. When an instruction signal for starting a sheet feed operation of the printing sheet P is input to the image forming apparatus 10, the pickup roller 38 and the pair of sheet feed rollers 39 are rotationally driven by a motor so that the printing sheet P is fed from the sheet feed tray 37. The printing sheet P fed by the pickup roller 38 is conveyed to a curved first conveying path 26 formed on a downstream side of a sheet feed direction of the printing sheet P by the pair of sheet feed rollers 39.

The first conveying path 26 is a curved conveying path that is curved upwardly from the pair of sheet feed rollers 39 and is then further curved rearwardly. The first conveying path 26 is provided with the sheet conveying unit 23. Upon receiving a rotational driving force from a conveying motor 56 (see FIG. 3), the sheet conveying unit 23 conveys the printing sheet P toward a downstream side in a conveying direction D11. The printing sheet P fed to the first conveying path 26 by the sheet feed device 15 passes through the first conveying path 26 to be conveyed to a second conveying path 27 by the sheet conveying unit 23.

It is noted that in the present embodiment, the control portion 90 controls rotational drive of the conveying motor 56 so that the printing sheet P conveyed by the sheet conveying unit 23 is conveyed at a predetermined reference speed $V_0$ (an example of a setting speed of the present disclosure) as will be described later.

Figure 3:
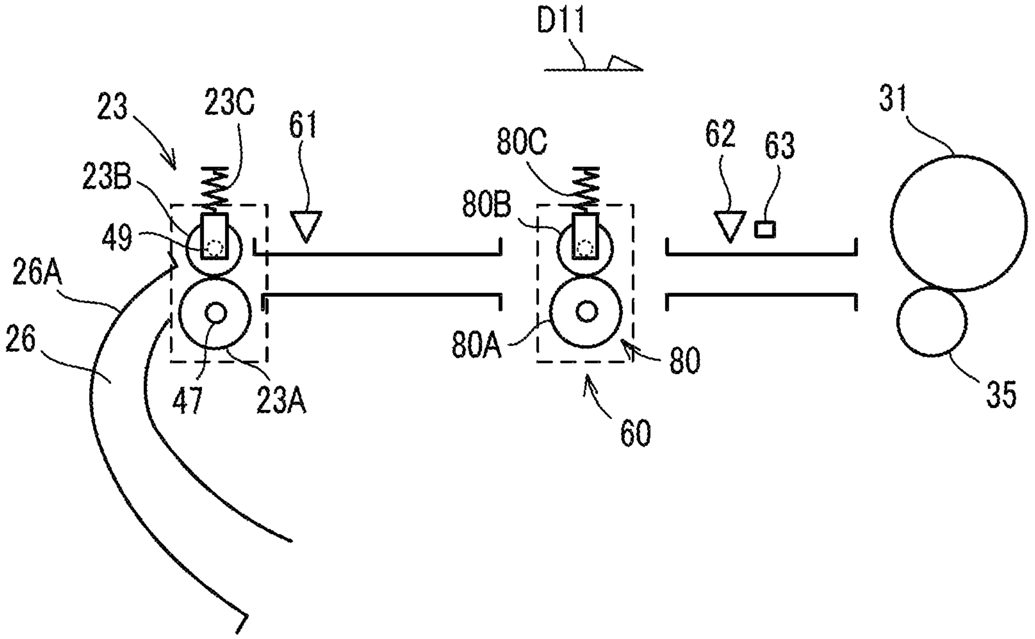
FIG. 3 is a schematic diagram showing a configuration in a periphery of a sheet conveying path of the image forming apparatus.

FIG. 3 is a schematic diagram showing a configuration in a periphery of the conveying paths 26 and 27. As shown in FIG. 3, the sheet conveying unit 23 includes a driving roller 23A that is rotationally driven by a driving force from the conveying motor 56 (see FIG. 5) and a driven roller 23B provided while being in contact with an outer circumferential surface of the driving roller 23A. The driving roller 23A and the driven roller 23B are an example of second conveying rollers of the present disclosure, and a pair of conveying rollers are realized by these respective rollers.

Figure 6:
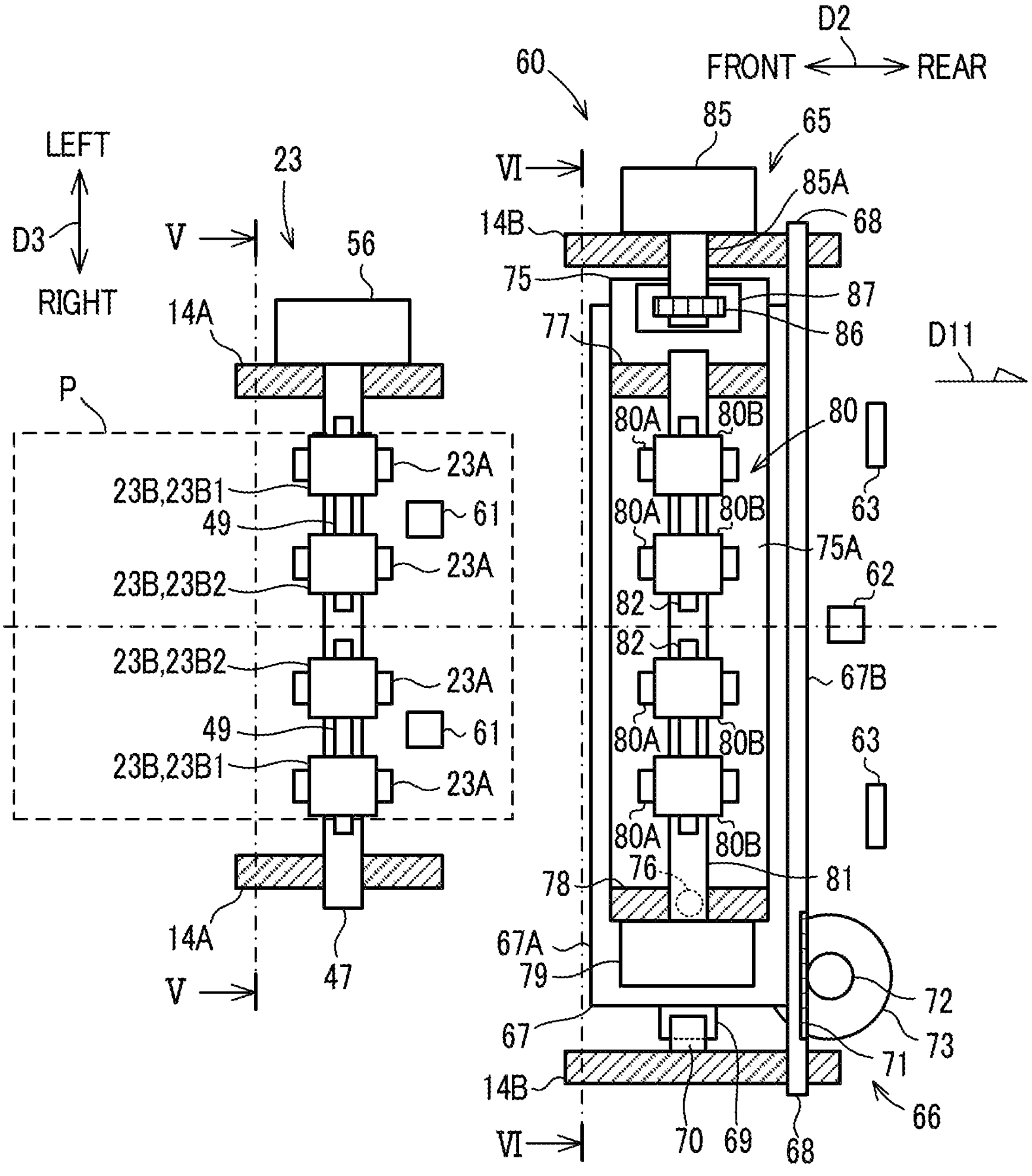
FIG. 6 is a schematic diagram showing a configuration of a sheet conveying unit and a sheet correction mechanism included in the image forming apparatus.

FIG. 6 shows the sheet conveying unit 23. As shown in FIG. 6, the sheet conveying unit 23 includes four driving rollers 23A that are provided at regular intervals along the left-right direction D3 orthogonal to the conveying direction D11. Hereinafter, the left-right direction D3 may be referred to as a width direction D3. Each of the driving rollers 23A is fixed to a rotation shaft 47 extending in the width direction D3, and this rotation shaft 47 is rotatably supported by an internal frame 14A of the housing 14. A driving force from the conveying motor 56 is transmitted to the rotation shaft 47. The conveying motor 56 is attached to the internal frame 14A, for example.

In addition, the sheet conveying unit 23 includes four driven rollers 23B corresponding to the respective driving rollers 23A. In other words, the sheet conveying unit 23 includes four pairs of conveying rollers arranged in the width direction D3. The respective four driven rollers 23B are rotatably supported by two rotation shafts 49 provided in a guide member 26A (see FIG. 3) constituting a conveying guide surface on an outer side of the first conveying path 26. The rotation shafts 49 are provided apart from each other in the width direction D3, and two driven rollers 23B are rotatably supported by each of the rotation shafts 49.

As shown in FIG. 3, the driven roller 23B is biased toward the driving roller 23A by a predetermined elastic force (spring force) of a spring 23C. Thus, the driven roller 23B is pressed against the driving roller 23A. The driven roller 23B is driven as the driving roller 23A is rotationally driven in this state.

Figure 7:
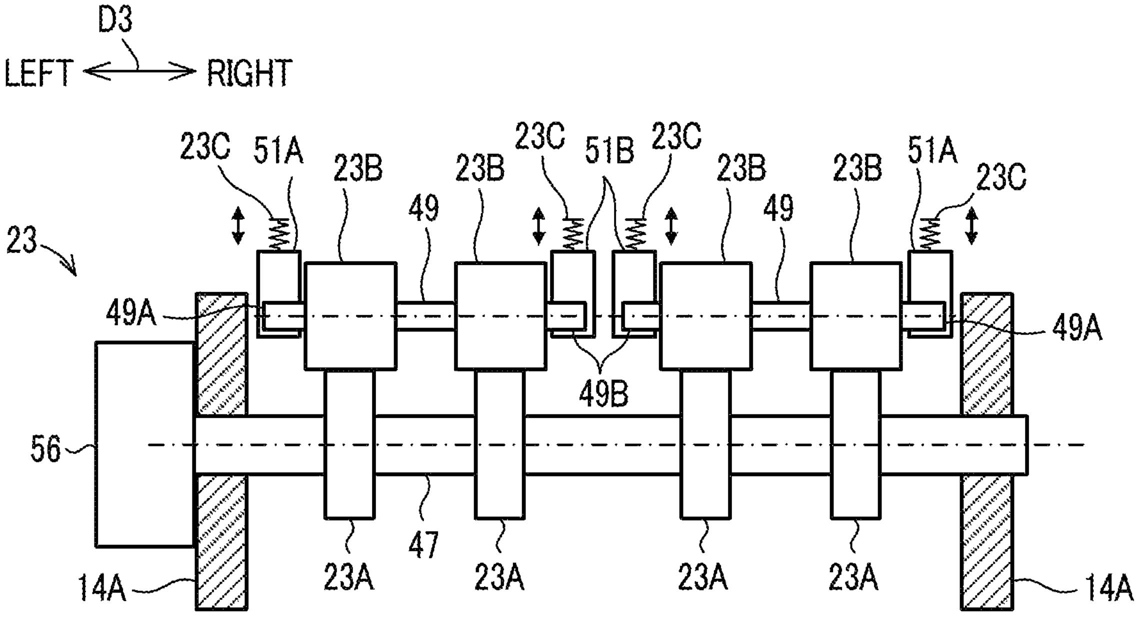
FIG. 7 is a schematic diagram showing the configuration of the sheet conveying unit included in the image forming apparatus.

FIG. 7 is a schematic diagram showing a configuration of the sheet conveying unit 23, the diagram showing a case where the sheet conveying unit 23 is seen from an upstream side of the conveying direction D11 in FIG. 6. As shown in FIG. 7, the rotation shafts 49 of the driven rollers 23B are rotatably supported by supporting portions 51A and 51B provided in the guide member 26A (see FIG. 3). In each of the rotation shafts 49, a shaft end portion 49A (an example of a first end portion) on an outer side thereof in the width direction D3 is supported by the supporting portion 51A, and a shaft end portion 49B on an inner side thereof in the width direction D3 is supported by the supporting portion 51B. The supporting portions 51A and 51B are biased downwardly by the springs 23C. In other words, the supporting portions 51A rotatably support the shaft end portions 49A while downwardly biasing the shaft end portions 49A by the spring force of the springs 23C. Moreover, the supporting portions 51B rotatably support the shaft end portions 49B while downwardly biasing the shaft end portions 49B by the spring force of the springs 23C.

In the guide member 26A (see FIG. 3), the supporting portions 51A and 51B are supported so as to be movable in the up-down direction D1. In the present embodiment, the supporting portions 51A and 51B support the driven rollers 23B such that the driven rollers 23B are movable between a pressing position (a position shown in FIG. 7) to be described later and a releasing position to be described later.

In a state where the supporting portions 51A and 51B are set at the pressing position shown in FIG. 7, the driven rollers 23B are elastically biased toward the driving rollers 23A by a predetermined spring force (elastic force) of the springs 23C. Thus, the driving rollers 23A and the driven rollers 23B are pressed against each other by the spring force. This spring force is an elastic force large enough to enable the printing sheet P to be nipped and conveyed in the conveying direction D11.

When the supporting portions 51A and 51B are raised upwardly from the pressing position and moved to the releasing position, the state where the driven rollers 23B are pressed against the driving rollers 23A is released. In other words, the releasing position is a position at which the driven rollers 23B are moved away from the driving rollers 23A to thus release the pressing with respect to the driving rollers 23A. It is noted that although the releasing position is described as a position at which the driven rollers 23B are moved away from the driving rollers 23A, surfaces of the driven rollers 23B and surfaces of the driving rollers 23A may be in contact with each other as long as the printing sheet P cannot be nipped and conveyed. In other words, the surfaces of the driven rollers 23B and the surfaces of the driving rollers 23A may be in contact with each other as long as a conveying force by the driven rollers 23B and the driving rollers 23A is not transmitted to the printing sheet P. Such a contact state is a state where the pressing state is released.

Figure 5:
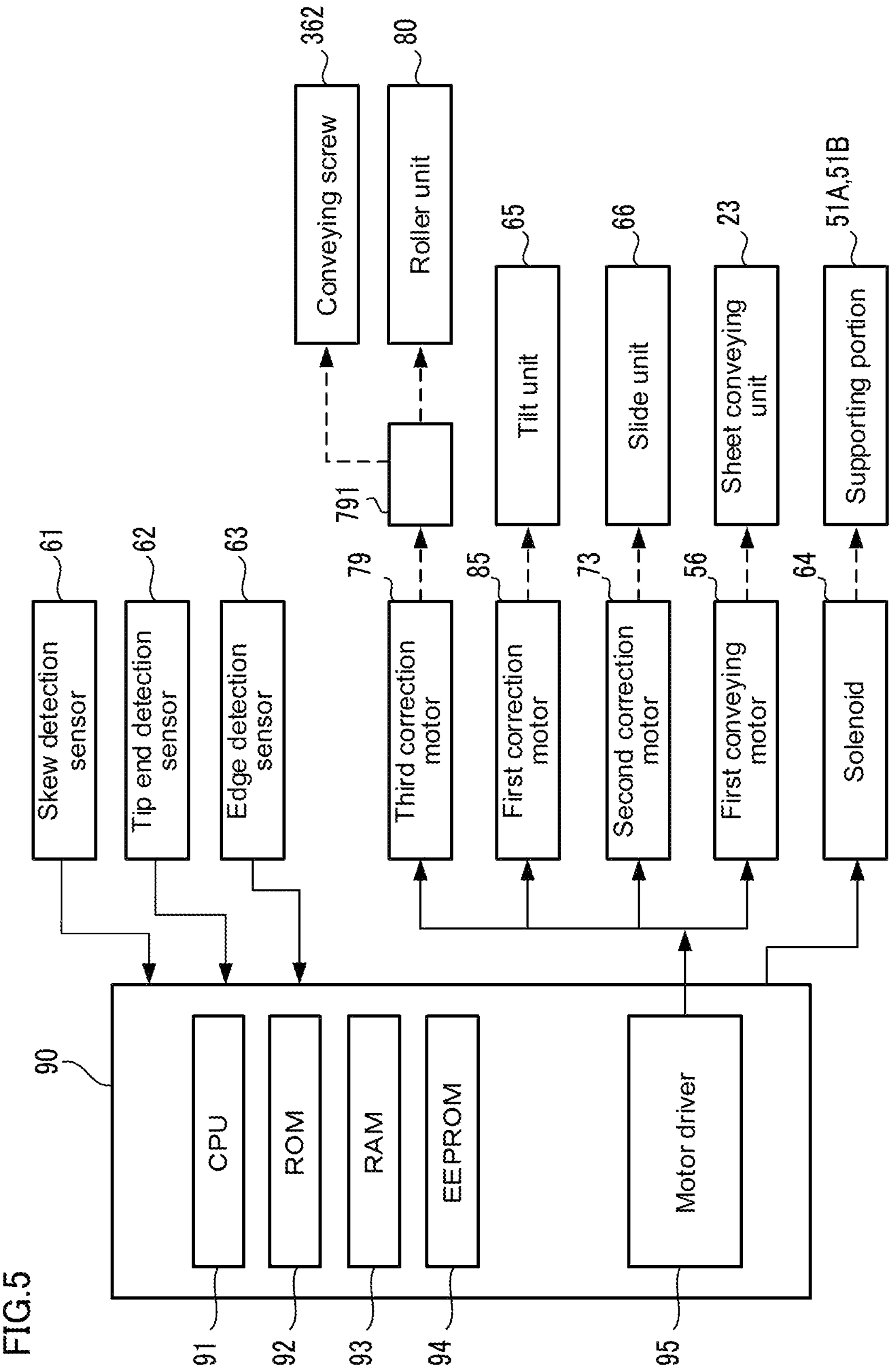
FIG. 5 is a block diagram showing the configuration of the image forming apparatus.

FIG. 5 is a block diagram showing a configuration of the image forming apparatus 10. As shown in FIG. 5, a solenoid 64 is provided inside the housing 14. The solenoid 64 is connected to the control portion 90 and operates by being energized by the control portion 90 controlling drive thereof. A plunger of the solenoid 64 is coupled to the supporting portions 51A and 51 via a link member (not shown), and the plunger operates as the solenoid 64 is energized, to thus move the supporting portions 51A and 51B to the releasing position. When the solenoid 64 is de-energized, the plunger returns to its original position by a tension spring provided in the solenoid 64, with the result that the supporting portions 51A and 51B are moved to the pressing position by the spring force of the springs 23C.

As shown in FIG. 3, the second conveying path 27 is formed successive to the first conveying path 26 inside the housing 14. The second conveying path 27 extends rearwardly generally in a horizontal direction from an end of the first conveying path 26 and reaches the image forming portion 18.

A skew detection sensor 61 is provided on the second conveying path 27. On the second conveying path 27, the skew detection sensor 61 is provided on a downstream side of the sheet conveying unit 23 in the conveying direction D11 and an upstream side of the sheet correction mechanism 60 in the conveying direction D11.

As shown in FIG. 6, the skew detection sensor 61 includes a pair of reflective optical sensors provided apart from each other at regular intervals from a center of the second conveying path 27 toward outer sides of the second conveying path 27 in the width direction D3. The reflective optical sensors described above each include a light-emitting element and a light-receiving element, and receives reflected light of light emitted from the light-emitting element to output a detection signal corresponding to the light reception amount. In the present embodiment, the skew detection sensor 61 is connected to the control portion 90, and a detection signal from each of the reflective optical sensors is transmitted to the control portion 90. Based on a deviation of a change of the detection signal transmitted from each of the pair of reflective optical sensors, the control portion 90 determines whether or not the printing sheet P conveyed by the sheet conveying unit 23 is skewed, and when skewed, determines a tilt direction thereof. In addition, the control portion 90 calculates a tilted amount (tilt amount) of the printing sheet P based on a deviation amount of each of the detection signals. Such a determination technique is well known from the past, so detailed descriptions thereof will be omitted.

It is noted that the skew detection sensor 61 may be a line sensor that extends outwardly from the center of the second conveying path 27 in the width direction D3. The line sensor described above is constituted of a plurality of image sensors arranged in one line along the width direction D3.

As shown in FIG. 3, the image forming portion 18 is provided at an end of the second conveying path 27. The image forming portion 18 carries out image forming processing (an example of image processing) for forming an image on the printing sheet P based on image data input from outside. Specifically, the image forming portion 18 forms a toner image on the printing sheet P using toner.

Figure 4:
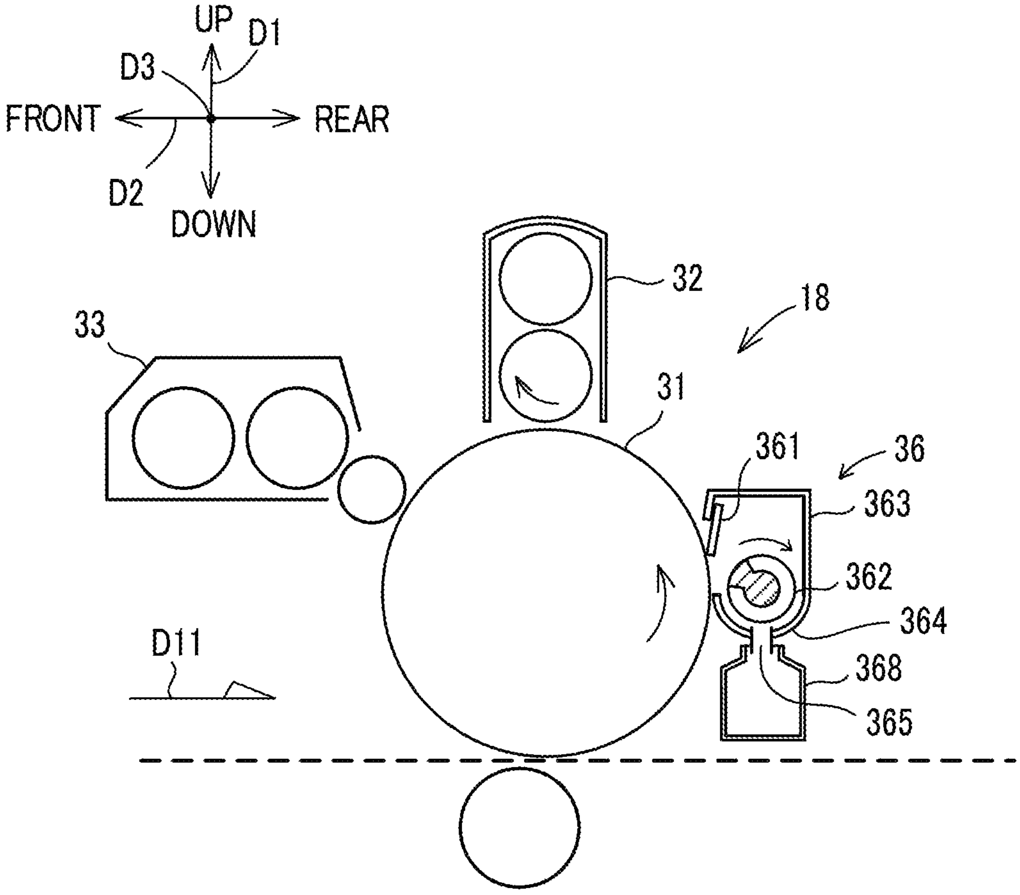
FIG. 4 is a schematic diagram showing a configuration of an image forming portion of the image forming apparatus.

FIG. 4 is a schematic diagram showing a configuration of the image forming portion 18. As shown in FIG. 4, the image forming portion 18 includes a photoconductor drum 31 (an example of an image-carrying member of the present disclosure), a charging portion 32, a developing portion 33, a transfer portion 35, and a cleaning portion 36 (an example of a cleaning device of the present disclosure). An electrostatic latent image is formed on a surface of the photoconductor drum 31 by the exposure device 17. By toner adhering onto the electrostatic latent image on the photoconductor drum 31 by the developing portion 33, the electrostatic latent image on the photoconductor drum 31 is developed. In other words, a toner image is formed on the surface of the photoconductor drum 31. When the printing sheet P conveyed on the second conveying path 27 reaches a transfer position, the toner image of the photoconductor drum 31 is transferred by the transfer portion 35. Here, the transfer position is a position at which the photoconductor drum 31 and the transfer portion 35 oppose each other. The printing sheet P onto which the toner image has been transferred is conveyed to a third conveying path 28 formed on a downstream side of the image forming portion 18 in the conveying direction D11 of the printing sheet P.

As shown in FIG. 2, the third conveying path 28 extends rearwardly from the image forming portion 18 and reaches the fixing portion 19. The printing sheet P conveyed to the third conveying path 28 from the image forming portion 18 passes through the third conveying path 28 to be conveyed to the fixing portion 19. The fixing portion 19 fixes the toner image transferred onto the printing sheet P, to the printing sheet P by heating and pressurization, and includes a heating roller 41 and a pressure roller 42. During a fixing operation, the heating roller 41 is heated to a high temperature by heating means such as an IH heater. When the printing sheet P passes through the fixing portion 19, toner is heated and melted by the heating roller 41 of the fixing portion 19 and further pressurized by the pressure roller 42. Thus, the toner image is fixed to the printing sheet P, and thus an image is formed on the printing sheet P. The printing sheet P to which the image has been fixed by the fixing portion 19 is conveyed to a fourth conveying path 29 formed on a downstream side of the fixing portion 19 in the conveying direction D11 of the printing sheet P.

The fourth conveying path 29 is curved upwardly from the fixing portion 19, then extends straight upwardly in a vertical direction, and is further curved forwardly, before reaching a paper sheet discharge outlet 22. In other words, the fourth conveying path 29 is formed from the fixing portion 19 to the paper sheet discharge outlet 22. A plurality of pairs of discharge rollers 24 are provided on the fourth conveying path 29. Upon receiving a rotational driving force from the motor, the pairs of discharge rollers 24 convey the printing sheet P toward the downstream side in the conveying direction D11 of the printing sheet P. The printing sheet P conveyed to the fourth conveying path 29 is conveyed upwardly through the fourth conveying path 29 by the pairs of discharge rollers 24 to be discharged from the paper sheet discharge outlet 22 to the sheet discharge portion 21 provided on an upper surface of the image forming apparatus 10.

As shown in FIG. 4, the cleaning portion 36 removes and cleans toner remaining on the surface of the photoconductor drum 31 (hereinafter, referred to as residual toner) after the toner image is transferred onto the printing sheet P from the photoconductor drum 31. The cleaning portion 36 is provided on a downstream side of the transfer portion 35 in a rotation direction of the photoconductor drum 31, specifically, provided between the transfer portion 35 and the charging portion 32 in the rotation direction of the photoconductor drum 31. The cleaning portion 36 includes a cleaning blade 361 (an example of a cleaning member), a conveying screw 362 (an example of a toner conveying member of the present disclosure), and a housing 363 that accommodates these.

The cleaning blade 361 is a plate-like member elongated in an axial direction of the photoconductor drum 31. A base end portion of the cleaning blade 361 is fixed to the housing 363, and the cleaning blade 361 extends from the base end portion toward the surface of the photoconductor drum 31. A tip end portion of the cleaning blade 361 is in contact with the surface of the photoconductor drum 31. Therefore, as the photoconductor drum 31 rotates, the cleaning blade 361 removes the residual toner by scraping it off from the surface of the photoconductor drum 31. It is noted that it is also possible to use a cleaning roller (brush roller) capable of removing the residual toner in place of the cleaning blade 361.

The housing 363 extends in the axial direction of the photoconductor drum 31 and includes, at a bottom portion thereof, a toner conveying path 364 extending in the axial direction. Toner removed by the cleaning blade 361 is dropped downwardly inside the housing 363 and collected in the toner conveying path 364. A toner discharge outlet 365 is formed at one end portion of the toner conveying path 364 in the width direction D3. The toner discharge outlet 365 is provided for guiding the residual toner collected in the toner conveying path 364 to a predetermined toner container 368. The toner container 368 is provided below the toner discharge outlet 365 so as to receive and store therein the residual toner discharged downwardly from the toner discharge outlet 365.

The conveying screw 362 conveys the residual toner removed from the photoconductor drum 31 toward the toner container 368. Specifically, the conveying screw 362 conveys the residual toner collected in the toner conveying path 364 toward the toner discharge outlet 365. The conveying screw 362 is a shaft member including a spiral blade on an outer circumferential surface thereof and is provided on the toner conveying path 364. By being input with a rotational driving force from a third correction motor 79 to be described later, the conveying screw 362 rotates in a predetermined rotation direction. Thus, the residual toner in the toner conveying path 364 is conveyed to the toner discharge outlet 365.

Incidentally, if a dedicated electric motor for driving the conveying screw 362 is provided, the number of electric motors installed increases, and thus the configuration of the image forming apparatus 10 cannot be simplified. Driving targets provided in the image forming apparatus 10 include the image-carrying member such as the photoconductor drum 31, the pair of sheet feed rollers 39 for conveying the printing sheet P (sheet) or the like, the sheet conveying unit 23, the conveying rollers provided in, the pairs of discharge rollers 24, and the like. There is a fear that if a movement speed (linear speed) on the surface of the image-carrying member becomes uneven, image quality will be lowered. Therefore, it is not favorable to distribute a driving force from the electric motor that drives the image-carrying member, to the conveying screw 362 in which a conveying load fluctuates. Moreover, the conveying rollers are not constantly driven and are sometimes stopped during image formation. Therefore, if the driving force is distributed to the conveying screw 362 from the electric motor that drives the conveying rollers, the residual toner will be collected in the toner conveying path 364 inside the housing 363 while the conveying screw 362 is stopped. In this case, there is a fear that the residual toner will become unbalanced in the toner conveying path 364 to thus cause toner jam in the toner conveying path 364.

Therefore, the image forming apparatus 10 of the present embodiment is configured to distribute a driving force to the conveying screw 362 from an electric motor for consecutively driving other driving targets (third correction motor). Thus, the number of electric motors can be reduced, and the configuration of the image forming apparatus 10 can be simplified.

As shown in FIG. 5, the conveying screw 362 receives the rotational driving force output from the third correction motor 79 via a drive transmission portion 791. The drive transmission portion 791 distributes the rotational driving force of the third correction motor 79 to a transmission path for transmission to the conveying screw 362 side and a transmission path for transmission to a roller unit 80 side to be described later. For example, the drive transmission portion 791 is constituted of a gear, a pulley, or the like.

As shown in FIG. 3, the sheet correction mechanism 60 is provided on the second conveying path 27. On the second conveying path 27, the sheet correction mechanism 60 is provided on the downstream side of the sheet conveying unit 23 in the conveying direction D11. It is noted that a configuration of the sheet correction mechanism 60 will be described later.

On the second conveying path 27, a tip end detection sensor 62 and an edge detection sensor 63 are provided on the downstream side of the sheet correction mechanism 60 in the conveying direction D11.

The tip end detection sensor 62 is provided near the center of the second conveying path 27 in the width direction D3. The tip end detection sensor 62 detects a tip end of the printing sheet P that has passed through the sheet correction mechanism 60. The tip end detection sensor 62 is, for example, a reflective optical sensor. The tip end detection sensor 62 is connected to the control portion 90, and a detection signal thereof is transmitted to the control portion 90. The control portion 90 detects a tip end of the printing sheet P based on a change of the detection signal transmitted from the tip end detection sensor 62. It is noted that such a detection technique is well known from the past, so detailed descriptions thereof will be omitted.

The edge detection sensor 63 is disposed on the downstream side of the tip end detection sensor 62 in the conveying direction D11. The edge detection sensor 63 detects both end positions of the printing sheet P that has passed through the sheet correction mechanism 60, in the width direction D3. The edge detection sensor 63 includes a pair of line sensors provided at positions apart from each other at regular intervals from the center of the second conveying path 27 toward the outer sides of the second conveying path 27 in the width direction D3. Each of the line sensors is constituted of a plurality of image sensors arranged in one line along the width direction D3. In the present embodiment, the edge detection sensor 63 is disposed such that the end portions of the printing sheet P in the width direction D3 pass through the respective line sensors. The edge detection sensor 63 is connected to the control portion 90 which determines a position of the printing sheet P in the width direction D3 based on an output signal (concentration signal) from the edge detection sensor 63. Specifically, the control portion 90 determines whether or not the printing sheet P is positioned at the center in the width direction D3, whether or not the printing sheet P is deviated toward either direction in the width direction D3, a level of a deviation amount (lateral deviation amount) of the printing sheet P in a case where the printing sheet P is deviated in the width direction D3, and the like. It is noted that such a determination technique is well known from the past, so detailed descriptions thereof will be omitted.

[Control Portion 90]

The control portion 90 collectively controls the image forming apparatus 10 and also controls operations of the sheet correction mechanism 60 to be described later. As shown in FIG. 5, the control portion 90 is constituted of a CPU 91, a ROM 92, a RAM 93, a flash memory 94, a motor driver 95, and the like. The control portion 90 is electrically connected to the respective motors 56, 73, 79, and 85, the respective sensors 61, 62, and 63, and the solenoid 64 via a signal line and the like. It is noted that the respective motors 56, 73, 79, and 85 are connected to the motor driver 95 of the control portion 90, and drive thereof is controlled upon receiving individual control signals from the motor driver 95.

[Sheet Correction Mechanism 60]

As shown in FIG. 3, the sheet correction mechanism 60 is provided on the second conveying path 27. On the second conveying path 27, the sheet correction mechanism 60 is provided on the downstream side of the sheet conveying unit 23 in the conveying direction D11. Specifically, the sheet correction mechanism 60 is provided between the skew detection sensor 61 and the tip end detection sensor 62 on the second conveying path 27.

Figure 8:
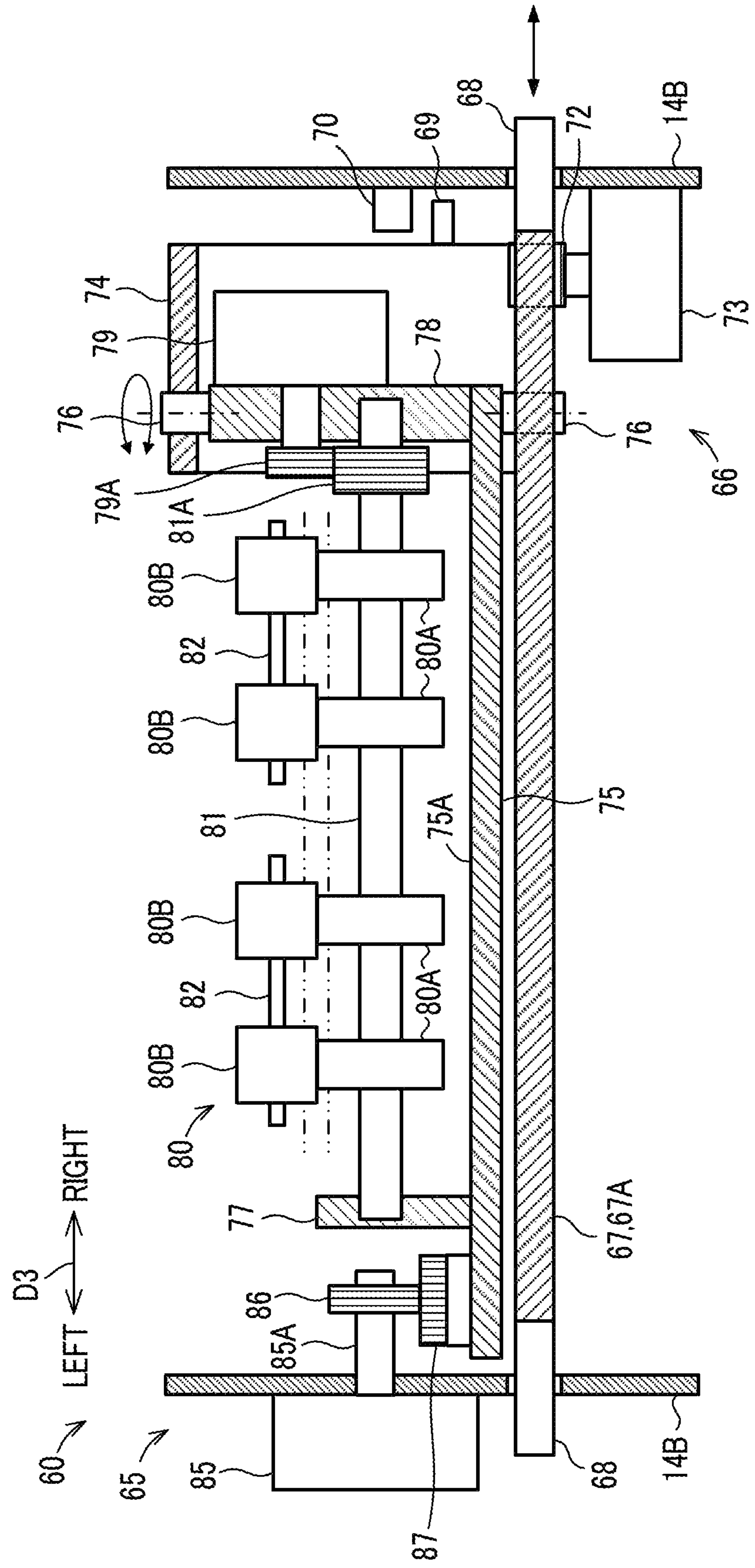
FIG. 8 is a schematic diagram showing the configuration of the sheet correction mechanism included in the image forming apparatus.

FIG. 8 is a schematic diagram showing a configuration of the sheet correction mechanism 60. As shown in FIG. 8, the sheet correction mechanism 60 includes a tilt unit 65 (an example of a skew correction device of the present disclosure) and a slide unit 66.

The tilt unit 65 is, before the printing sheet P in a skewed state, that has been conveyed by the sheet conveying unit 23, enters the sheet correction mechanism 60, rotated from a predetermined initial position to a correction position at which a skew correction can be performed, only by a tilted amount (tilt amount) corresponding to a tilt of the printing sheet P, and is, after the printing sheet P enters the sheet correction mechanism 60, rotated back from the correction position to the initial position while nipping the printing sheet P, to thus correct the skew of the printing sheet P. Here, the initial position is a position at which the printing sheet P can be conveyed straight toward the downstream side in the conveying direction D11 by the roller unit 80 to be described later. In the present embodiment, a rotational frame 75 and the roller unit 80 of the tilt unit 65 are rotated between the initial position and the correction position.

In a case where the printing sheet P conveyed by the sheet conveying unit 23 is deviated in the width direction D3, the slide unit 66 moves the printing sheet P in a direction of correcting the deviation (direction opposite to deviation direction) only by that deviated amount, to thus correct the deviation of the printing sheet P in the width direction D3.

As shown in FIG. 6 and FIG. 8, the slide unit 66 includes a base frame 67 elongated in the width direction D3. The base frame 67 is movably supported by an internal frame 14B of the housing 14 so as to be movable in the width direction D3. Specifically, the base frame 67 includes a horizontal flat plate-like base portion 67A and a supporting portion 67B (see FIG. 6) integrally formed at a rear end portion of the base portion 67A (right side in FIG. 6). The supporting portion 67B includes shaft portions 68 protruding outwardly from both end portions of the base portion 67A in the width direction D3, and the supporting portion 67B is supported by inserting the shaft portions 68 into shaft holes formed in the internal frame 14B.

As shown in FIG. 6, a rack 71 is formed on a rear end surface of the supporting portion 67B. A pinion gear 72 interlocks with this rack 71. The slide unit 66 includes a second correction motor 73. The pinion gear 72 is attached to an output shaft of the second correction motor 73. Therefore, by controlling drive of the second correction motor 73, the control portion 90 can cause the base frame 67 of the slide unit 66 to slide in either direction (right direction or left direction) of the width direction D3.

As shown in FIG. 6, a protrusion piece 69 protruding toward the right side is formed at a right end portion of the base frame 67. Moreover, an optical sensor 70 capable of sensing the protrusion piece 69 is provided in the right-side internal frame 14B. The optical sensor 70 senses a position of the protrusion piece 69. Based on a position at which the protrusion piece 69 is sensed by the optical sensor 70 (hereinafter, referred to as slide reference position), the control portion 90 moves the base frame 67 in the width direction D3.

In addition, a supporting portion 74 (see FIG. 8) for supporting a rotation shaft 76 (an example of a rotation fulcrum of the present disclosure) to be described later is provided near the right end portion of the base portion 67A.

As shown in FIG. 6 and FIG. 8, the tilt unit 65 includes the rotational frame 75 supported by the base portion 67A of the base frame 67, the roller unit 80 rotatably supported by the rotational frame 75, and a first correction motor 85 that applies a driving force in the rotation direction to the rotational frame 75. The rotational frame 75 is a plate-like member elongated in the width direction D3, and the rotation shaft 76 extending in the up-down direction D1 is provided at a right end portion thereof. The rotation shaft 76 is rotatably supported by the supporting portion 74 (see FIG. 8) provided in the base frame 67.

A pair of supporting walls 77 and 78 are provided on an upper surface 75A of the rotational frame 75 while being apart from each other in the width direction D3 at a predetermined interval. The pair of supporting walls 77 and 78 protrude upwardly from the upper surface 75A. The predetermined interval is a length with which the printing sheet P can be conveyed between the pair of supporting walls 77 and 78. The roller unit 80 is rotatably supported by the supporting walls 77 and 78.

The roller unit 80 is rotationally driven by the third correction motor 79. The roller unit 80 conveys the printing sheet P that has entered the sheet correction mechanism 60 toward the downstream side in the conveying direction D11. The roller unit 80 includes driving rollers 80A that are rotated by a rotational driving force from the third correction motor 79 and driven rollers 80B that are provided while being in contact with outer circumferential surfaces of the driving rollers 80A. The driving rollers 80A and the driven rollers 80B are an example of the first conveying rollers of the present disclosure, and the pair of conveying rollers are realized by these respective rollers.

In the present embodiment, the third correction motor 79 is controlled by the control portion 90 to be driven consecutively during an image forming operation. Further, as will be described later, by the control portion 90 controlling the rotational drive of the third correction motor 79, a conveying speed V of the printing sheet P conveyed by the roller unit 80 is adjusted.

Specifically, by the control portion 90 controlling the third correction motor 79, the conveying speed V of the printing sheet P by the driving rollers 80A and the driven rollers 80B is, before the printing sheet P enters the sheet correction mechanism 60, lowered from the reference speed $V_0$ to a predetermined low speed $V_L$ (an example of a first conveying speed of the present disclosure) lower than the reference speed $V_0$. In the present embodiment, when a tip end of the printing sheet P is detected by the skew detection sensor 61, the control portion 90 controls the third correction motor 79 to lower the conveying speed V to the low speed $V_L$. It is noted that the skew detection sensor 61 in this case is an example of a first sheet detection portion of the present disclosure.

As described above, when the printing sheet P is conveyed by the sheet conveying unit 23 and the roller unit 80 in a state where the conveying speed V by the roller unit 80 is lowered, the printing sheet P is bent in a curve.

Further, by the control portion 90 controlling the third correction motor 79, the conveying speed V is raised to a high speed $V_H$ (an example of a second conveying speed of the present disclosure) higher than the reference speed $V_0$ after the printing sheet P enters the sheet correction mechanism 60 and is started to be conveyed by the driving rollers 80A and the driven rollers 80B. In the present embodiment, when the tip end of the printing sheet P is detected by the tip end detection sensor 62, the control portion 90 controls the third correction motor 79 to raise the conveying speed V from the low speed $V_L$ to the high speed $V_H$. It is noted that the tip end detection sensor 62 in this case is an example of a second sheet detection portion of the present disclosure.

As described above, since the conveying speed V of the printing sheet P by the roller unit 80 is raised, the bending of the printing sheet P can be eliminated.

Furthermore, by the control portion 90 controlling the third correction motor 79, the conveying speed V is set back from the high speed $V_H$ to the reference speed $V_0$ before the printing sheet P reaches the transfer position of the toner image by the transfer portion 35. In the present embodiment, when a predetermined time has elapsed since the detection of the tip end of the printing sheet P by the tip end detection sensor 62, the control portion 90 controls the third correction motor 79 to set back the conveying speed V from the high speed $V_H$ to the reference speed $V_0$.

As described above, since the conveying speed V of the printing sheet P by the roller unit 80 is set back to the reference speed $V_0$ that is the same as the conveying speed by the sheet conveying unit 23, transfer of a toner image is carried out appropriately at the transfer position.

The roller unit 80 includes the four driving rollers 80A arranged at regular intervals along the width direction D3. The respective driving rollers 80A are fixed to a rotation shaft 81 extending in the width direction D3, and this rotation shaft 81 is rotatably supported by the supporting walls 77 and 78. The third correction motor 79 is fixed to the supporting wall 78, and a rotational driving force is transmitted to the rotation shaft 81 via an output gear 79A fixed to an output shaft of the third correction motor 79 and an input gear 81A fixed to an end portion of the rotation shaft 81. The roller unit 80 also includes the four driven rollers 80B respectively corresponding to the driving rollers 80A. The four driven rollers 80B are respectively rotatably supported by rotation shafts 82 provided in a guide member constituting a conveying guide surface on an upper side of the second conveying path 27. Two rotation shafts 82 are provided while being apart from each other in the width direction D3, and two driven rollers 80B are rotatably supported by each of the rotation shafts 82.

The driven rollers 80B are biased toward the driving rollers 80A by springs 80C (see FIG. 3). Thus, the driven rollers 80B are pressed against the driving rollers 80A. The driven rollers 80B are driven when the driving rollers 80A are rotationally driven in this state.

The first correction motor 85 is attached to the left-side internal frame 14B. The first correction motor 85 is fixed to an outer surface of the internal frame 14B, and an output shaft 85A of the first correction motor 85 penetrates through the internal frame 14B and extends to the other side (right side). A pinion gear 86 is fixed to a tip end of the output shaft 85A of the first correction motor 85. A rack 87 extending in the front-rear direction D2 is formed at a left end portion of the upper surface 75A of the rotational frame 75. The rack 87 interlocks with the pinion gear 86. The rack 87 includes parallel teeth arranged in the front-rear direction D2. The control portion 90 controls drive of the first correction motor 85 to thus cause the rotational frame 75 of the tilt unit 65 to rotate about the rotation shaft 76.

[Sheet Correction Processing]

Figure 9:
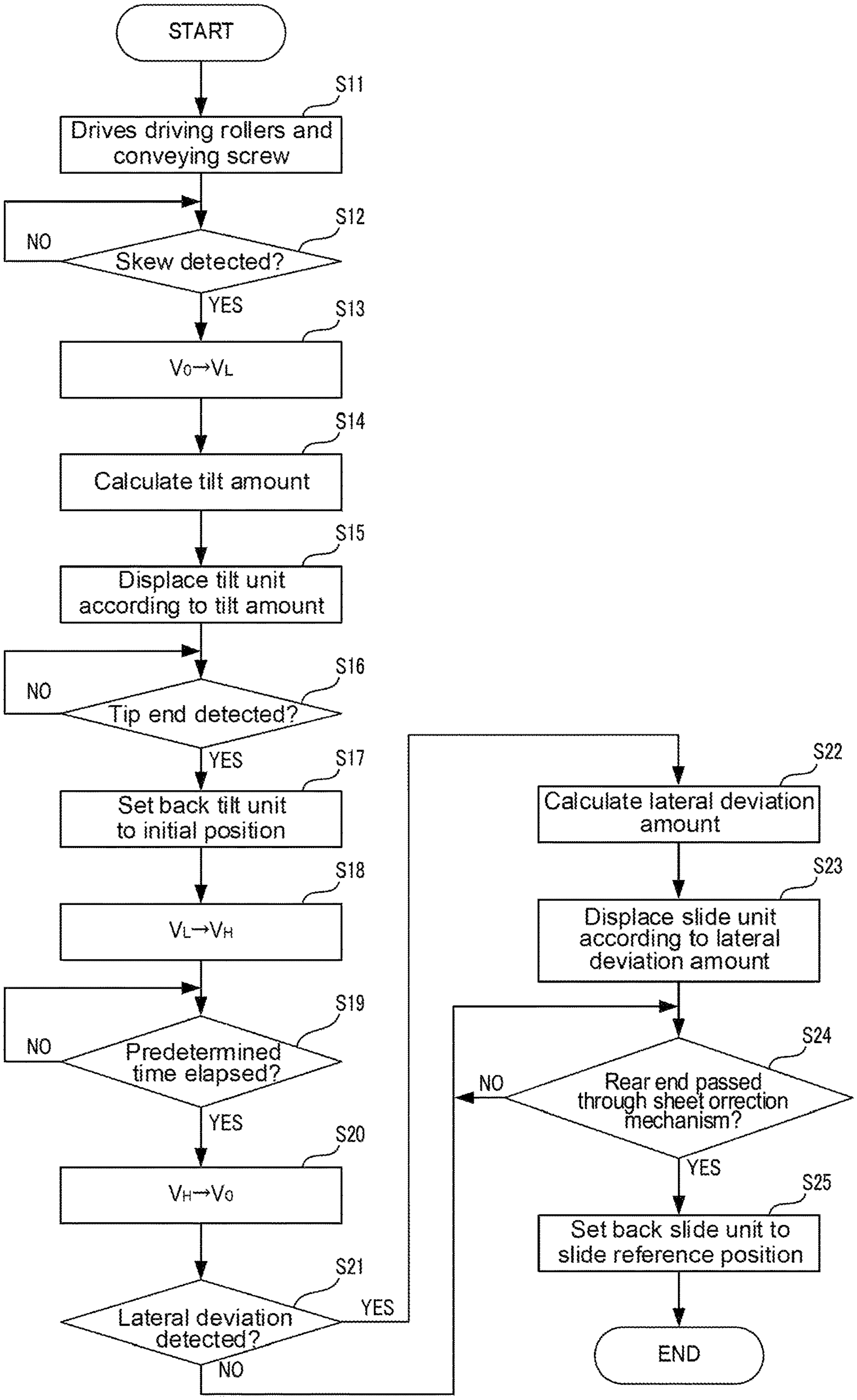
FIG. 9 is a flowchart showing exemplary procedures of sheet correction processing executed by a control portion included in the image forming apparatus.
Figure 10:
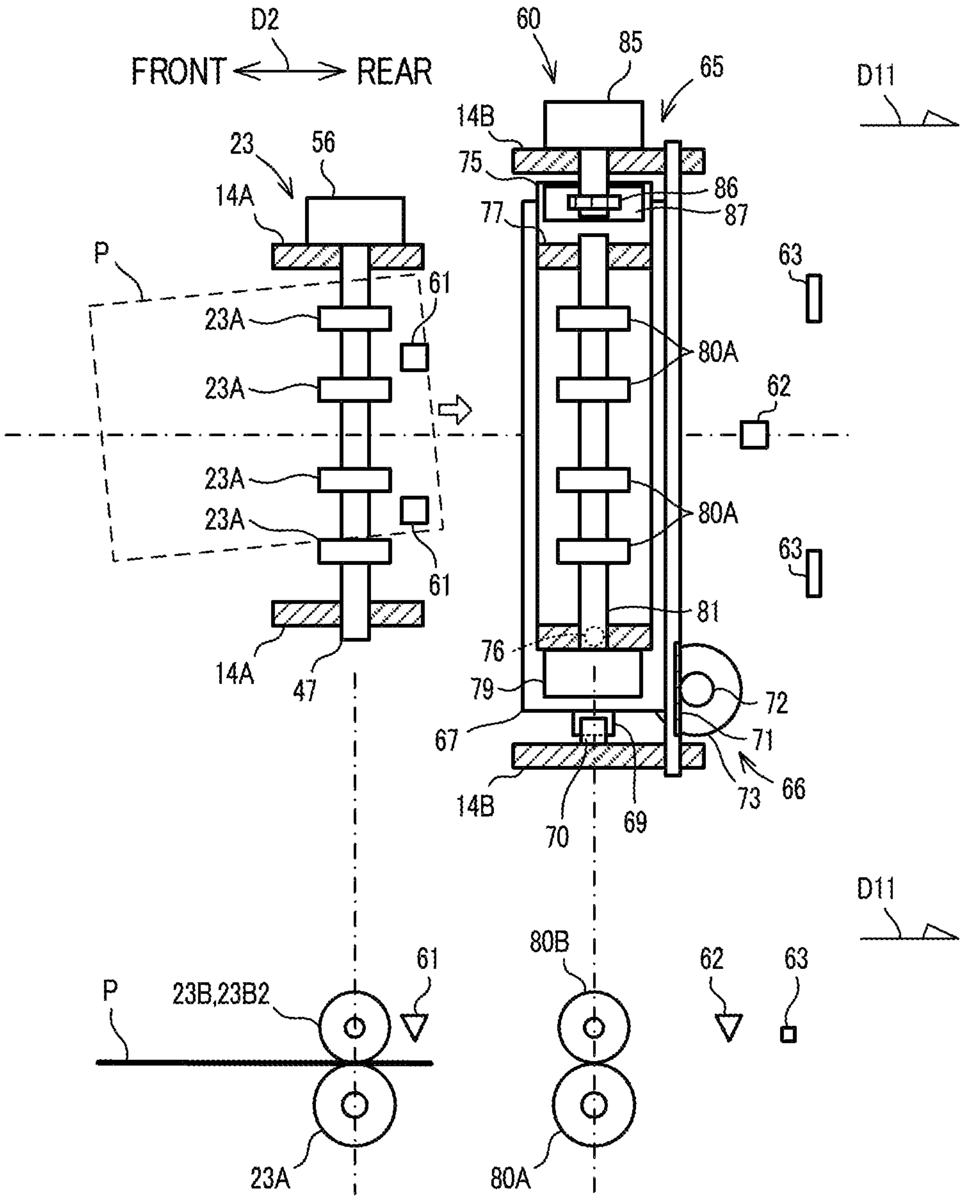
FIG. 10 is a diagram for explaining operations of the sheet conveying unit and the sheet correction mechanism included in the image forming apparatus.

Hereinafter, exemplary procedures of sheet correction processing executed by the control portion 90 will be described with reference to operational explanatory diagrams shown in FIG. 10 to FIG. 16 and a flowchart shown in FIG. 9. Here, FIG. 10 to FIG. 16 are diagrams for explaining operations of the sheet conveying unit 23 and the sheet correction mechanism 60, in each of which an upper diagram is a plan view and a lower diagram is a side view. It is noted that in the image forming apparatus 10, it is assumed that, before the sheet correction processing is carried out, the rotational frame 75 of the tilt unit 65 is set at the initial position, and the slide unit 66 is set at the slide reference position.

In Step S11, when an instruction signal that instructs to start an image forming operation is input to the image forming apparatus 10, the motor driver 95 of the control portion 90 drives the conveying motor 56, the third correction motor 79, other motors (not shown), and the like to cause the pickup roller 38, the pair of sheet feed rollers 39, the driving rollers 23A of the sheet conveying unit 23, the driving rollers 80A of the roller unit 80, the pairs of discharge rollers, and the like to rotate. Thus, the printing sheet P is taken out from the sheet feed tray 37 to be fed to the first conveying path 26, and further conveyed by the sheet conveying unit 23 to the second conveying path 27. Further, a rotational driving force from the third correction motor 79 is also transmitted to the conveying screw 362 via the drive transmission portion 791. Therefore, by driving the third correction motor 79, the conveying screw 362 is also rotated. At this time, the control portion 90 controls the respective motors so that the conveying speed of the printing sheet P becomes the reference speed $V_0$. Therefore, the conveying screw 362 is rotated at a rotation speed corresponding to the reference speed $V_0$.

In Step S12, when a tip end of the printing sheet P is detected by the skew detection sensor 61 (see FIG. 10), the control portion 90 determines whether or not the printing sheet P conveyed by the sheet conveying unit 23 is skewed based on a detection signal of the skew detection sensor 61. When determined in Step S12 that the printing sheet P is skewed, in the next Step S13, the control portion 90 controls the third correction motor 79 such that the conveying speed V becomes the low speed $V_L$. In other words, the control portion 90 lowers the conveying speed V from the reference speed $V_0$ to the low speed $V_L$. In the present embodiment, the low speed $V_L$ is set to be 0.7 times the reference speed $V_0$. At this time, the conveying screw 362 is rotated at a rotation speed corresponding to the low speed $V_L$.

In the next Step S14, the control portion 90 calculates a tilt direction and tilt amount of the printing sheet P based on the detection signal of the skew detection sensor 61.

Figure 11:
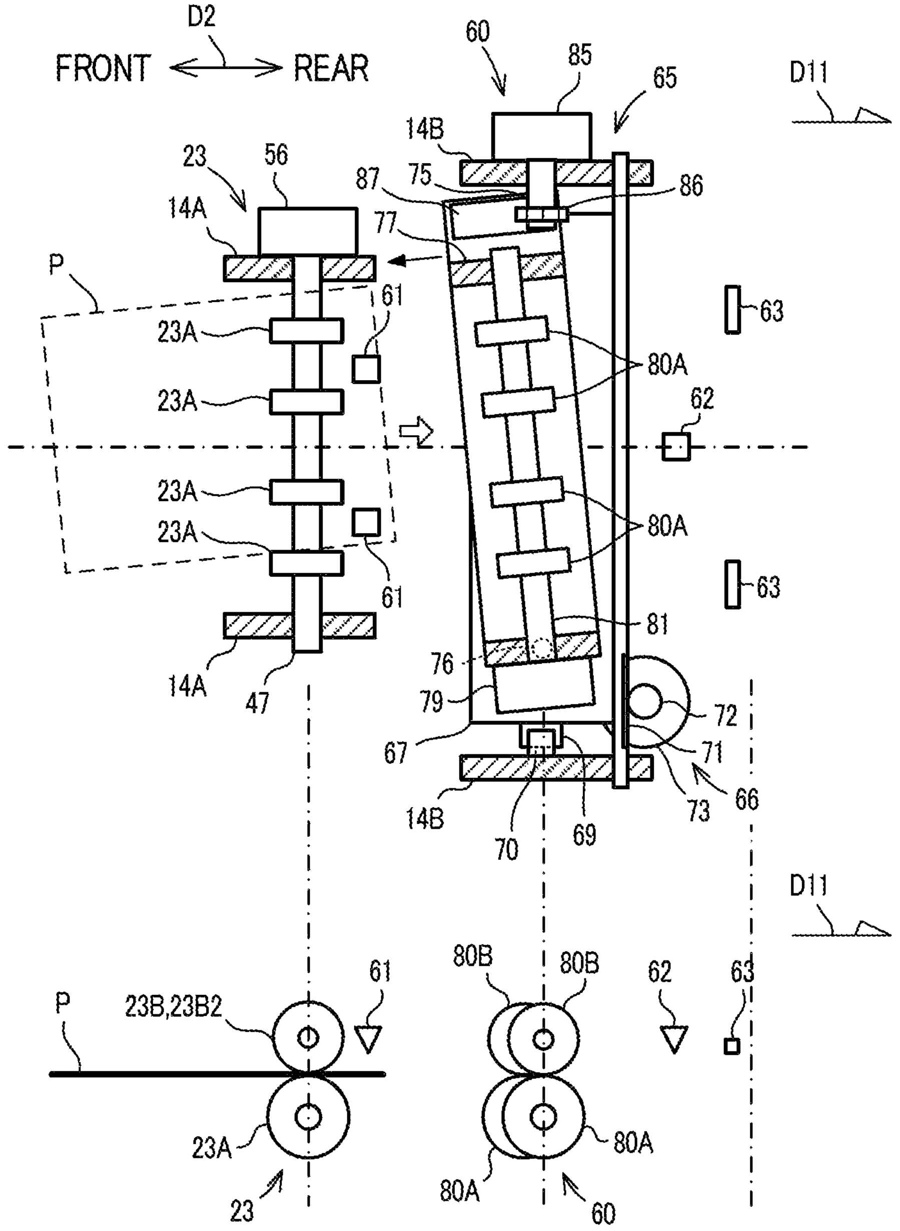
FIG. 11 is a diagram for explaining operations of the sheet conveying unit and the sheet correction mechanism included in the image forming apparatus.

After that, in Step S15, the control portion 90 controls drive of the first correction motor 85 so that, before the printing sheet P enters the sheet correction mechanism 60, the tilt unit 65 is rotated from the initial position to the correction position at which the skew correction can be performed, in accordance with the tilt amount (see FIG. 11). Specifically, the rotational frame 75 of the tilt unit 65 is rotated from the initial position to the correction position only by the tilt amount in a direction opposite to the tilt direction of the printing sheet P. FIG. 11 shows a rotational orientation in which the rotational frame 75 and roller unit 80 of the tilt unit 65 are rotated in a direction of approaching the printing sheet P. After that, as the printing sheet P enters the sheet correction mechanism 60, the printing sheet P is conveyed toward the downstream side in the conveying direction D11 at the low speed $V_L$ by the roller unit 80.

Figure 12:
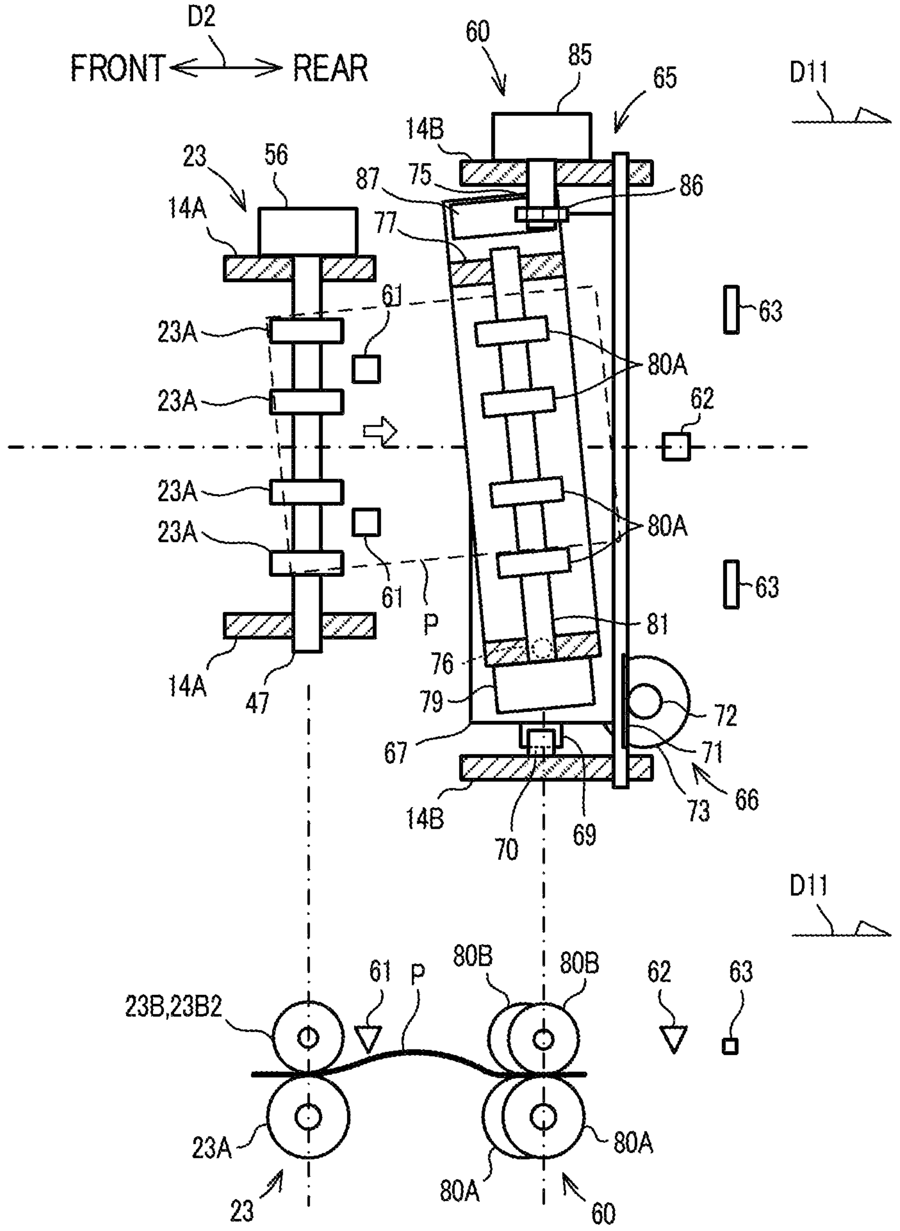
FIG. 12 is a diagram for explaining operations of the sheet conveying unit and the sheet correction mechanism included in the image forming apparatus.

In this case, since the sheet conveying unit 23 conveys the printing sheet P at the reference speed $V_0$ and the roller unit 80 conveys the printing sheet P at the low speed $V_L$, the printing sheet P is bent in a curve according to a difference between the conveying speeds and a movement amount in the conveying direction D11 (see FIG. 12). Since such bending occurs in the printing sheet P, the printing sheet P is prevented from being damaged even when the printing sheet P is pulled in the conveying direction D11 at a time the rotational frame 75 and roller unit 80 of the tilt unit 65 are set back to the initial position from the rotational orientation shown in FIG. 12, and thus a slip mark due to slipping of the rollers is prevented from being left on the printing sheet P, as will be described later.

Figure 13:
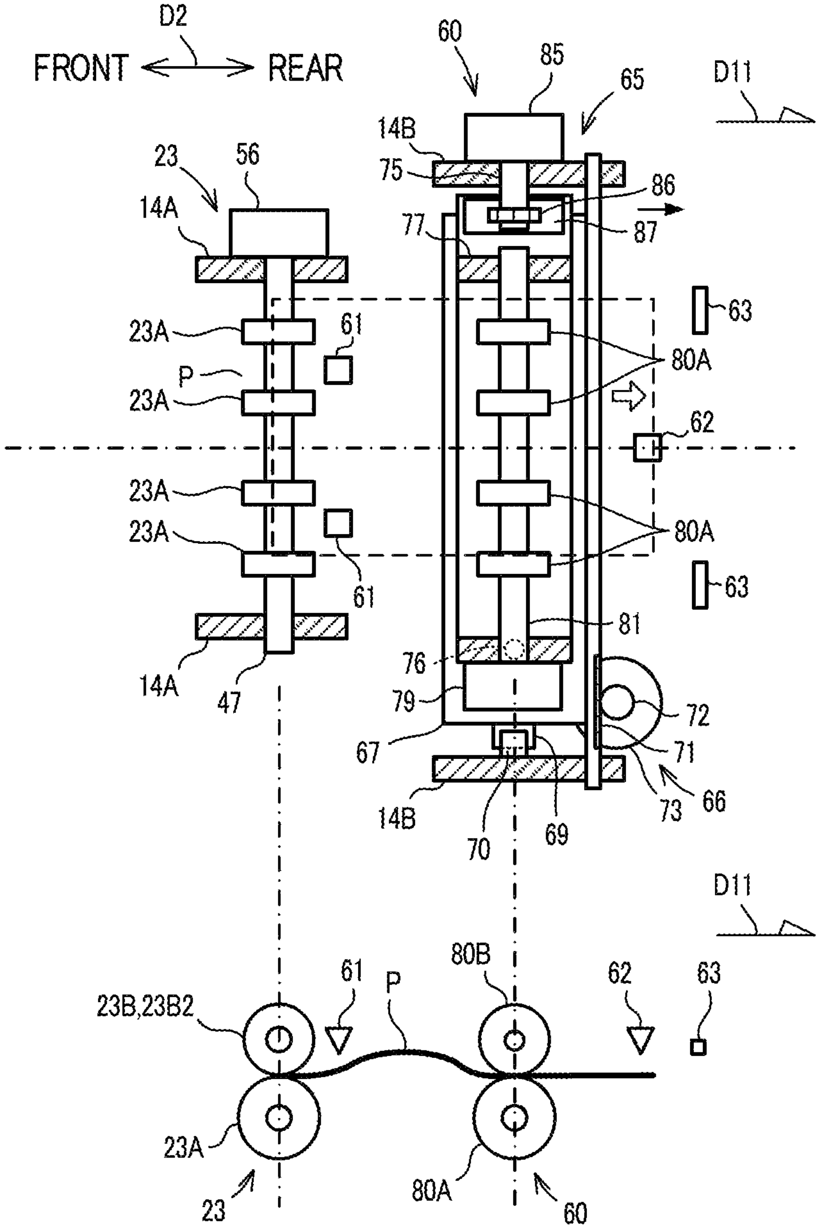
FIG. 13 is a diagram for explaining operations of the sheet conveying unit and the sheet correction mechanism included in the image forming apparatus.

When the tip end of the printing sheet P reaches the tip end detection sensor 62 and the tip end of the printing sheet P is detected by the control portion 90 (S16), in Step S17, the control portion 90 sets back the rotational frame 75 and roller unit 80 of the tilt unit 65 to the initial position (see FIG. 13). Specifically, the tilt unit 65 is rotated only by the tilt amount in a direction opposite to the direction rotated in Step S15. Thus, the skew of the printing sheet P is corrected. At this time, a portion of the printing sheet P on the upstream side of the conveying direction D11 is nipped by the pairs of conveying rollers, that is, the driving rollers 23A and the driven rollers 23B. However, since the printing sheet P is bent, the printing sheet P is not forcibly pulled by the tilt unit 65.

In addition, when the tip end of the printing sheet P is detected (S16), in Step S18, the control portion 90 controls the third correction motor 79 such that the conveying speed V becomes the high speed $V_H$. In other words, the control portion 90 raises the conveying speed V from the low speed $V_L$ to the high speed $V_H$. In the present embodiment, the high speed $V_H$ is set to be 1.3 times the reference speed $V_0$. At this time, the conveying screw 362 is rotated at a rotation speed corresponding to the high speed $V_H$.

Figure 14:
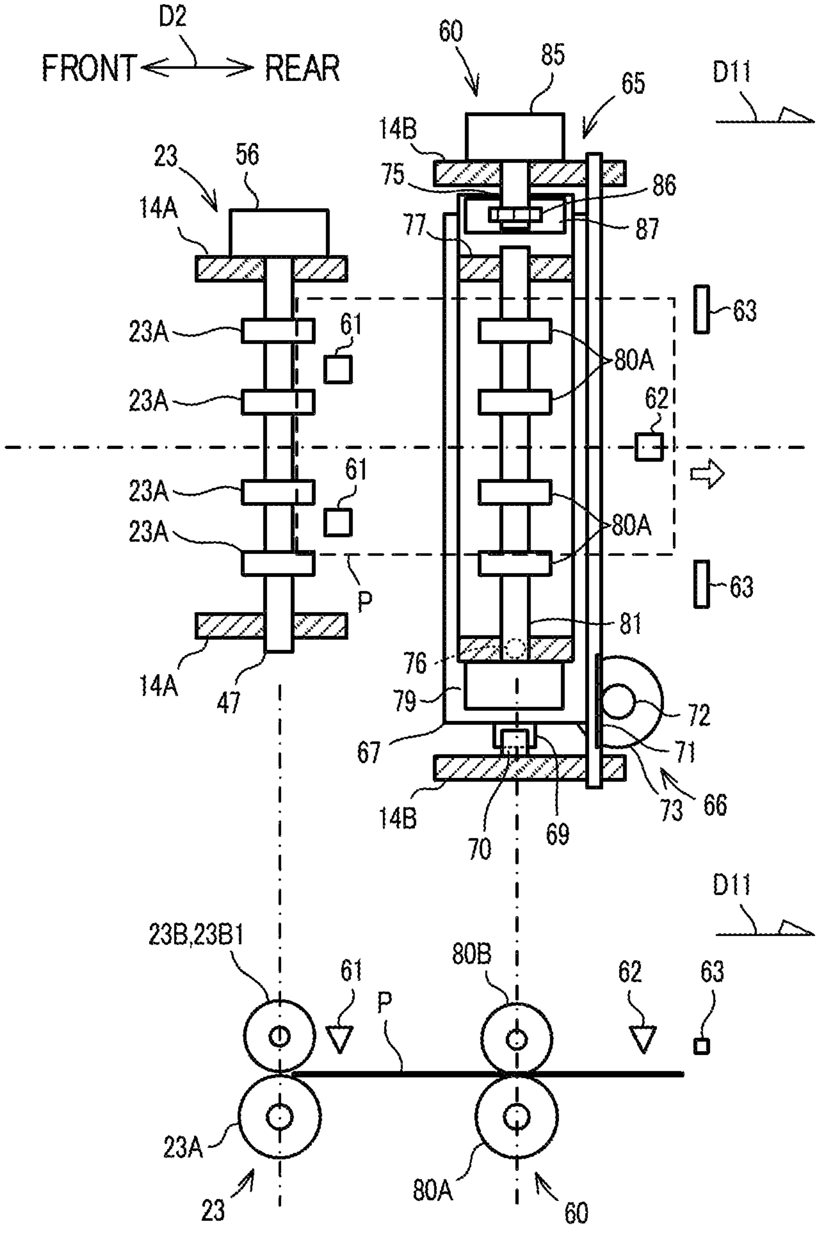
FIG. 14 is a diagram for explaining operations of the sheet conveying unit and the sheet correction mechanism included in the image forming apparatus.

In this case, since the conveying speed V of the printing sheet P by the roller unit 80 is raised to the high speed $V_H$, the bending caused in the printing sheet P can be eliminated as shown in FIG. 14.

After that, the control portion 90 determines whether or not a predetermined time has elapsed since the tip end of the printing sheet P has been detected by the tip end detection sensor 62 (S19), and when the predetermined time has elapsed, the control portion 90 controls the third correction motor 79 to set back the conveying speed V from the high speed $V_H$ to the reference speed $V_0$. It is noted that the predetermined time is defined as a time required to eliminate the bending formed in the printing sheet P.

For example, this predetermined time is obtained from various types of information including a bending amount of the printing sheet P obtained in accordance with a speed difference between the reference speed $V_0$ by the sheet conveying unit 23 and the low speed $V_L$ by the roller unit 80 and a movement amount of the printing sheet P in the conveying direction D11, the tilt amount and tilt direction calculated in Step S14, and the like.

Figure 15:
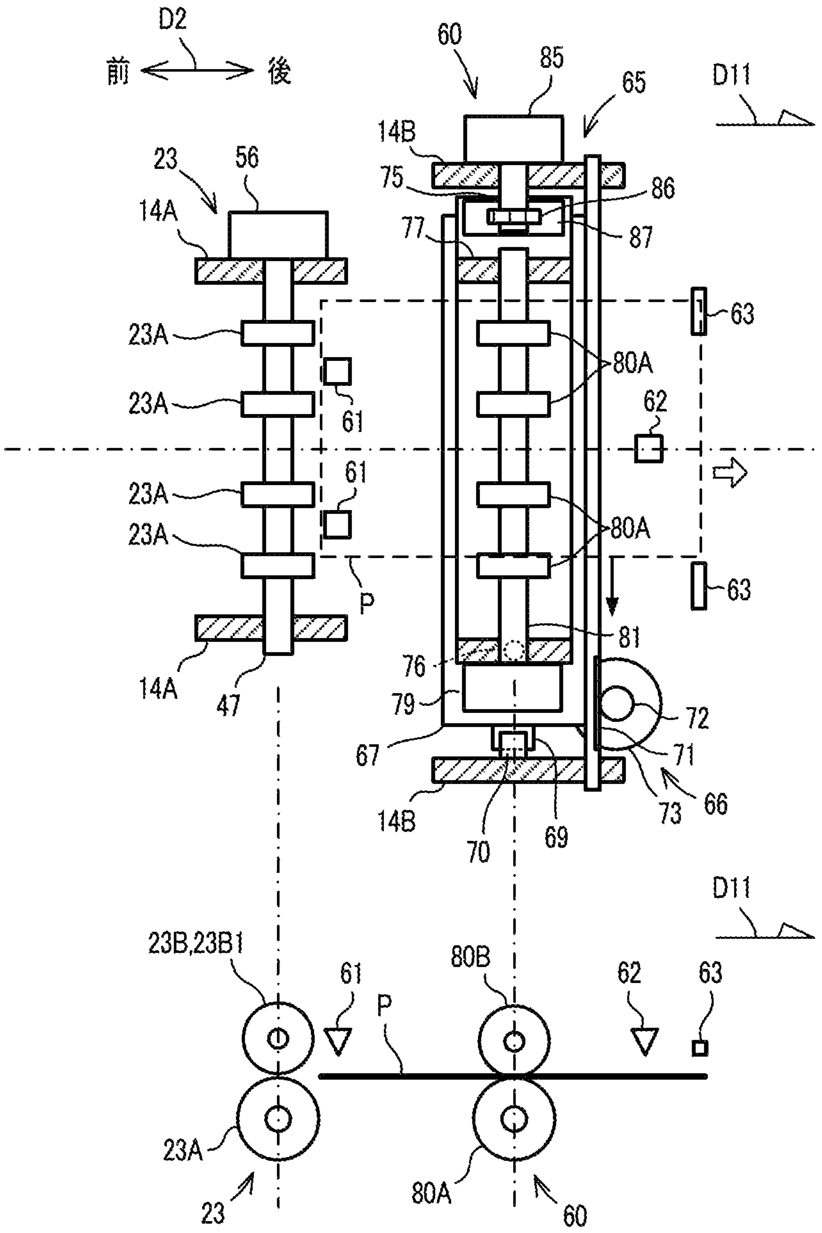
FIG. 15 is a diagram for explaining operations of the sheet conveying unit and the sheet correction mechanism included in the image forming apparatus.
Figure 16:
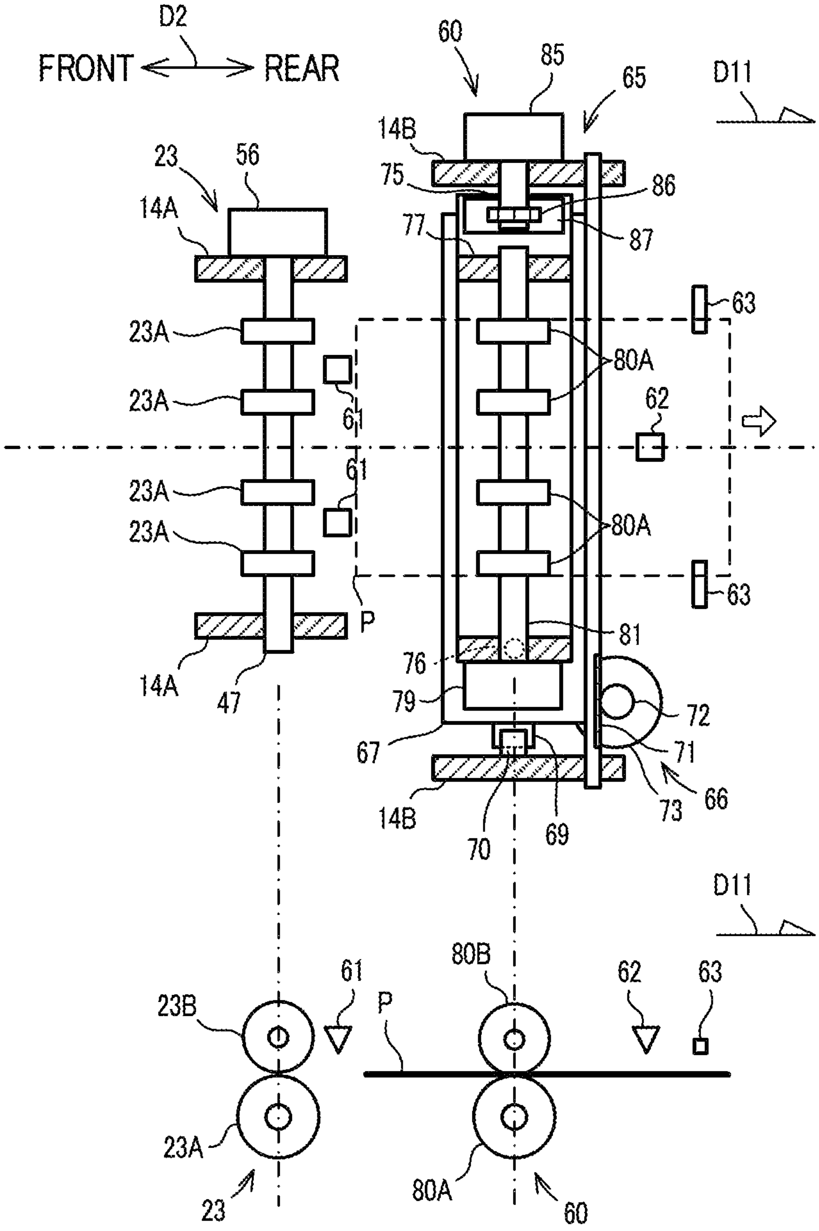
FIG. 16 is a diagram for explaining operations of the sheet conveying unit and the sheet correction mechanism included in the image forming apparatus.

When the tip end of the printing sheet P reaches the edge detection sensor 63 as shown in FIG. 15, in the next Step S21, the control portion 90 determines whether or not the printing sheet P is deviated in either direction (right side or left side) of the width direction D3 based on a detection signal of the edge detection sensor 63. Here, when there is a deviation in the width direction D3 (lateral deviation), the processing advances to Step S22, and a lateral deviation amount is calculated. On the other hand, when there is no lateral deviation, the processing advances to Step S24.

In Step S22, the control portion 90 calculates a lateral deviation direction and lateral deviation amount of the printing sheet P. After that, in Step S23, the control portion 90 controls the slide unit 66 to slide in a deviation correction direction (see arrow in FIG. 15) according to the lateral deviation amount. Specifically, the control portion 90 controls drive of the second correction motor 73 so that the slide unit 66 is moved from the slide reference position only by the lateral deviation amount in a direction opposite to the lateral deviation direction of the printing sheet P. Thus, the lateral deviation of the printing sheet P is corrected (see FIG. 16).

It is noted that when a rear end of the printing sheet P has not passed through the sheet conveying unit 23 before the slide movement in Step S23, the control portion 90 operates the solenoid 64 to move the supporting portions 51A and 51B to the releasing position in advance. After that, the control portion 90 performs the slide movement in Step S23. Thus, it is possible to prevent only the tip end portion of the printing sheet P from being deviated in the width direction D3. For example, the control portion 90 can determine whether or not the rear end of the printing sheet P has passed through the sheet conveying unit 23 based on a change in the output of the skew detection sensor 61. Further, upon ending the slide movement, the control portion 90 stops energization of the solenoid 64 and moves the supporting portions 51A and 51B back to the pressing position.

After the slide movement in Step S23, in Step S24, the control portion 90 determines whether or not the rear end of the printing sheet P has passed through the sheet correction mechanism 60. Then, when determining that the rear end of the printing sheet P has passed through the sheet correction mechanism 60, the control portion 90 sets back the slide unit 66 to the slide reference position (S25). Upon ending the image forming processing with respect to the printing sheet P, the control portion 90 stops driving the respective motors 56, 73, 79, and 85 and ends the series of processing.

As described above, in the present embodiment, before the tilt unit 65 is set back to the initial position after the tilt unit 65 is rotated from the initial position to the correction position, the conveying speed of the printing sheet P is lowered to the low speed $V_L$, and thus the printing sheet P is bent. Therefore, the tilt unit 65 can be set back to the initial position without forcibly pulling the printing sheet P. In other words, no load is applied to the printing sheet P while the tilt unit 65 returns. Moreover, since the conveying speed of the printing sheet P is raised to the high speed $V_H$ after the tilt unit 65 returns to the initial position, a situation where the printing sheet P is conveyed while being bent is prevented from occurring. In other words, the bending of the printing sheet P is eliminated. Further, since the conveying speed of the printing sheet P is set back to the reference speed $V_0$ after that, the transfer of a toner image is carried out appropriately at the transfer position.

In addition, not only the roller unit 80 but also the conveying screw 362 is rotated by the rotational driving force of the third correction motor 79 that is consecutively driven during the image forming operation. In other words, the roller unit 80 and the conveying screw 362 are driven by a single electric motor. Therefore, the number of electric motors can be reduced, and thus the configuration of the image forming apparatus 10 can be simplified.

Further, since the conveying speed V of the printing sheet P by the roller unit 80 is changed from the reference speed $V_0$ to the low speed $V_L$, then changed to the high speed $V_H$, and further set back to the reference speed $V_0$ after that, the rotation speed of the conveying screw 362 that rotates upon receiving the rotational driving force of the third correction motor 79 also fluctuates according to the speed fluctuation of the conveying speed V. Therefore, even when residual toner is adhered onto the conveying screw 362 in the toner conveying path 364, the adhered residual toner is shaken off by the fluctuation of the rotation speed of the conveying screw 362, and thus the residual toner is efficiently and smoothly conveyed to the toner discharge outlet 365.

It is noted that although the descriptions have been given on the example where the low speed $V_L$ is 0.7 times the reference speed $V_0$ and the high speed $V_H$ is 1.3 times the reference speed $V_0$ in the embodiment described above, the present disclosure is not limited to such an example. The low speed $V_L$ and the high speed $V_H$ only need to be set within ranges in which the printing sheet P can be bent moderately and residual toner adhered onto the conveying screw 362 can be shaken off. Specifically, the low speed $V_L$ only needs to be 0.5 $V_0$ or more and smaller than $V_0$, and the high speed $V_H$ only needs to be larger than $V_0$ and 1.5 $V_0$ or less.

Furthermore, although the configuration in which one image forming portion 18 is provided is exemplified in the embodiment described above, the present disclosure is also applicable to a color image forming apparatus including a plurality of image forming portions 18, such as a color printer, for example. In this case, the rotational driving force of the third correction motor 79 is also input to a conveying screw provided in a belt cleaning device that removes residual toner remaining on an intermediate transfer belt provided in the color image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus that forms an image on a sheet by transferring a toner image carried by an image-carrying member onto the sheet, the image forming apparatus comprising:

a skew correction device that corrects a skew of the sheet conveyed in a predetermined conveying direction on a conveying path leading to a transfer position; and a cleaning device that removes residual toner remaining on the image-carrying member after the transfer, and conveys the residual toner to a predetermined container, wherein the skew correction device includes first conveying rollers rotatable about a predetermined rotation fulcrum, the first conveying rollers being, before the sheet, which is skewed, enters a the skew correction device, rotated from an initial position only by a tilt amount corresponding to a tilt of the sheet, and, when the sheet enters the the skew correction device, rotated back to the initial position while nipping and conveying the sheet, the cleaning device includes a toner conveying member that conveys the residual toner removed from the image-carrying member to the predetermined container, and both the first conveying rollers and the toner conveying member operate by consecutively receiving a rotational driving force from a common electric motor.

2. The image forming apparatus according to claim 1, further comprising second conveying rollers that are provided on an upstream side of the skew correction device in the conveying direction and convey the sheet toward a downstream side in the conveying direction at a predetermined setting speed, wherein a conveying speed of the sheet by the first conveying rollers is lowered from the setting speed to a first conveying speed lower than the setting speed before the sheet enters the skew correction device, the conveying speed is raised to a second conveying speed higher than the setting speed after the sheet enters the skew correction device and is started to be conveyed by the first conveying rollers, and the conveying speed is set back to the setting speed before the sheet reaches the transfer position.

3. The image forming apparatus according to claim 2, further comprising:

a control portion that controls a rotation speed of the electric motor;

a first sheet detection portion arranged on the upstream side of the skew correction device in the conveying direction; and a second sheet detection portion arranged on a downstream side of the skew correction device in the conveying direction, wherein the control portion controls the electric motor to lower the conveying speed to the first conveying speed when a tip end of the sheet is detected by the first sheet detection portion, controls the electric motor to raise the conveying speed to the second conveying speed when the tip end of the sheet is detected by the second sheet detection portion, and controls the electric motor to set back the conveying speed to the setting speed when a predetermined setting time has elapsed since the raise of the conveying speed to the second conveying speed.

4. The image forming apparatus according to claim 2, wherein the first conveying speed is, when the setting speed is represented by $V_0$, a speed that is 0.5 $V_0$ or more and smaller than $V_0$, and the second conveying speed is a speed that is larger than $V_0$ and 1.5 $V_0$ or less.

* * * * *